(12) United States Patent
Song

(10) Patent No.: US 12,736,850 B2
(45) Date of Patent: Sep. 15, 2026

(54) DISPLAY MODULE AND ELECTRONIC DEVICE

(71) Applicant: VIVO MOBILE COMMUNICATION CO.,LTD., Dongguan (CN)

(72) Inventor: Yalei Song, Dongguan (CN)

(73) Assignee: VIVO MOBILE COMMUNICATION CO., LTD., Dongguan (CN)

( * ) Notice: Subject to any disclaimer, the term of this patent is extended or adjusted under 35 U.S.C. 154(b) by 255 days.

(21) Appl. No.: 18/643,065

(22) Filed: Apr. 23, 2024

(65) Prior Publication Data

US 2024/0272509 A1 Aug. 15, 2024

Related U.S. Application Data

(63) Continuation of application No. PCT/CN2022/126590, filed on Oct. 21, 2022.

(30) Foreign Application Priority Data

Oct. 26, 2021 (CN) ......................... 202111248982.2

(51) Int. Cl.
*G02F 1/167* (2019.01)
*G02F 1/16757* (2019.01)
(Continued)

(52) U.S. Cl.
CPC .......... *G02F 1/167* (2013.01); *G02F 1/16757* (2019.01); *G02F 1/1676* (2019.01); *G02F 1/1685* (2019.01)

(58) Field of Classification Search
CPC .... G02F 1/167; G02F 1/16757; G02F 1/1676; G02F 1/1685; G02F 2001/1678; G02F 1/1675
See application file for complete search history.

(56) References Cited

U.S. PATENT DOCUMENTS

2006/0038772 A1* 2/2006 Amundson ............. G02F 1/167 345/107
2009/0147185 A1 6/2009 Quach
(Continued)

FOREIGN PATENT DOCUMENTS

CN 101889245 A 11/2010
CN 106773444 A 5/2017
(Continued)

OTHER PUBLICATIONS

Examiner provided machine translation of Kaihotsu, WO 2014147731 A1 (Year: 2014).*

*Primary Examiner* — Balram T Parbadia
(74) *Attorney, Agent, or Firm* — The Webb Law Firm

(57) ABSTRACT

A display module includes a composite light-emitting layer, an electronic ink layer, and a cover plate layer disposed in sequence. The electronic ink layer includes a plurality of capsule bodies that are arranged along a plane on which the cover plate layer is located. A first electrode and a second electrode are provided on a periphery of a capsule body; and ink particles are accommodated in the capsule body. In a case that a voltage is applied to the first electrode, the ink particles are distributed along the first electrode and the display module is configured to perform displaying through the electronic ink layer; and in a case that a voltage is applied to the second electrode and a voltage is applied to the composite light-emitting layer, the ink particles are distributed along the second electrode and the display module is configured to perform displaying through the composite light-emitting layer.

18 Claims, 4 Drawing Sheets

(51) Int. Cl.
*G02F 1/1676* (2019.01)
*G02F 1/1685* (2019.01)

(56) References Cited

U.S. PATENT DOCUMENTS

| | | | | |
|---|---|---|---|---|
| 2012/0147452 | A1 | 6/2012 | Park et al. | |
| 2013/0335809 | A1* | 12/2013 | Shields | G09G 3/344 359/296 |
| 2016/0238917 | A1* | 8/2016 | Zhang | G02F 1/1677 |
| 2018/0059499 | A1* | 3/2018 | Klement | H10K 59/50 |
| 2018/0284489 | A1* | 10/2018 | Wang | G02F 1/1676 |
| 2020/0249528 | A1* | 8/2020 | Zhang | G02F 1/133528 |
| 2020/0341343 | A1 | 10/2020 | You et al. | |
| 2021/0364830 | A1 | 11/2021 | Wang et al. | |
| 2024/0280871 | A1* | 8/2024 | Cai | G02F 1/153 |

FOREIGN PATENT DOCUMENTS

| | | | |
|---|---|---|---|
| CN | 108919573 | A | 11/2018 |
| CN | 212341653 | U | 1/2021 |
| CN | 113985678 | A | 1/2022 |
| JP | 2001125512 | A | 5/2001 |
| JP | 2005128819 | A | 5/2005 |
| KR | 1020190053571 | A | 5/2019 |
| WO | 2014147731 | A1 | 9/2014 |
| WO | 2018032803 | A1 | 2/2018 |

* cited by examiner

DISPLAY MODULE AND ELECTRONIC DEVICE

CROSS-REFERENCE TO RELATED APPLICATIONS

This application is a Bypass Continuation Application of International Patent Application No. PCT/CN2022/126590, filed Oct. 21, 2022, and claims priority to Chinese Patent Application No. 202111248982.2, filed Oct. 26, 2021, the disclosures of which are hereby incorporated by reference in their entireties.

BACKGROUND OF THE INVENTION

Field of the Invention

The present disclosure relates to the technical field of electronic devices, and in particular, to a display module and an electronic device.

Description of Related Art

Nowadays, electronic displays are available in various display modes, which can meet people's visual needs such as watching movies, playing games and reading. There are, for example, organic light-emitting diode (OLED) displays and electronic-ink displays.

However, regardless of the type of electronic display, due to different lighting mechanisms thereof, display screens may have monotonous display modes, and it is difficult for them to adapt to changed scenes. Consequently, user experience is degraded.

SUMMARY OF THE INVENTION

According to a first aspect, an embodiment of the present disclosure provides a display module including a composite light-emitting layer, an electronic ink layer, and a cover plate layer disposed in sequence. The electronic ink layer includes a plurality of capsule bodies, and the plurality of capsule bodies are arranged along a plane on which the cover plate layer is located, where a first electrode and a second electrode are provided on a periphery of the capsule body, the first electrode is a transparent electrode and is disposed parallel to the cover plate layer, and the second electrode is disposed perpendicular to the cover plate layer; and ink particles are accommodated in the capsule body. In a case that a voltage is applied to the first electrode, the ink particles are distributed along the first electrode and the display module is configured to perform displaying through the electronic ink layer; and in a case that a voltage is applied to the second electrode and a voltage is applied to the composite light-emitting layer, the ink particles are distributed along the second electrode and the display module is configured to perform displaying through the composite light-emitting layer.

According to a second aspect, an embodiment of the present disclosure provides an electronic device, including the foregoing display module.

REFERENCE NUMERALS

Figure 1:
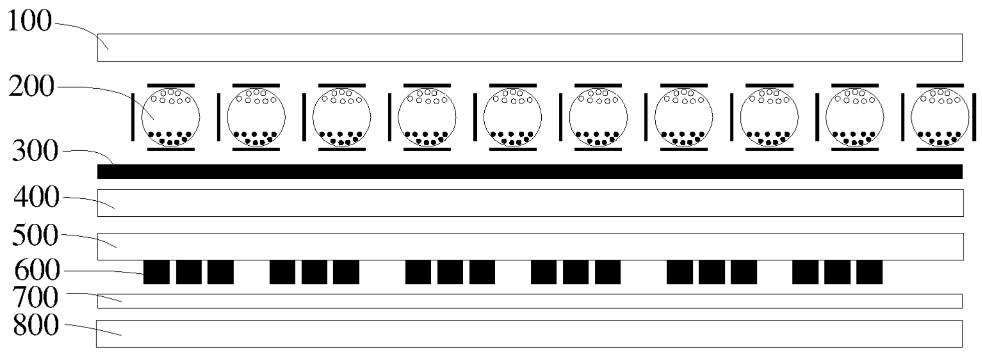
FIG. 1 is a structural diagram of a display module disclosed in a first embodiment of the present disclosure.

100—cover plate layer;
200—capsule body, 201—ink particle;
210—first electrode, 211—first cathode layer, 212—first anode layer;
220—second electrode, 230—third electrode, 240—fourth electrode;
300—transparent insulating layer;
800—fifth cathode layer, 700—electron transport layer, 600—organic light-emitting layer, 500—hole transport layer, 400—fifth anode layer.

DESCRIPTION OF THE INVENTION

The following clearly describes the technical solutions in embodiments of the present disclosure with reference to the accompanying drawings in embodiments of the present disclosure. It is clear that the described embodiments are some but not all of the embodiments of the present disclosure. Based on the embodiments in the present disclosure, all other embodiments obtained by persons of ordinary skill in the art fall within the protection scope of the present disclosure.

In the specification and claims of the present disclosure, terms "first", "second", and the like are intended to distinguish between similar objects but do not indicate a specific order or sequence. It should be understood that data used in this way is used interchangeably in appropriate circumstances so that the embodiments of the present disclosure can be implemented in other orders than the order illustrated or described herein. In addition, "first", "second", and the like are usually used to distinguish objects of a same type, and do not restrict a quantity of objects. For example, there may be one or a plurality of first objects. In addition, "and/or" in the specification and claims represents at least one of connected objects, and the character "/" generally indicates that the contextually associated objects have an "or" relationship.

A display module and an electronic device provided in embodiments of the present disclosure are described in detail below by using embodiments and application scenarios thereof in combination with the accompanying drawings.

Refer to FIG. 1 to FIG. 12. The present disclosure discloses a display module including a composite light-emitting layer, an electronic ink layer, and a cover plate layer 100 stacked sequentially along a main light-emitting direction. The display module of the present disclosure has the following features: The display module can choose to emit light through the composite light-emitting layer or the electronic ink layer according to different application scenarios and user needs, so as to switch a display mode of the display module, thereby improving user experience. Detailed descriptions are provided below.

The cover plate layer 100 in the present disclosure is a light-emitting side of the display module, and is a side that the display module faces the user, and the cover plate layer 100 is conventionally a glass cover plate to ensure good light transmittance and to protect internal devices of the display module.

The electronic ink layer includes a plurality of capsule bodies 200. The plurality of capsule bodies 200 are arranged along a plane on which the cover plate layer 100 is located. For example, the plurality of capsule bodies 200 are arranged in an array distribution to form the electronic ink layer. The plurality of capsule bodies 200 are arranged in a direction perpendicular to the main light-emitting direction of the display module.

A first electrode 210 and a second electrode 220 are provided on a periphery of the capsule body 200. The first electrode 210 is a transparent electrode and is disposed parallel to the cover plate layer 100, and the second electrode 220 is disposed perpendicular to the cover plate layer 100, so as to generate electric field forces in different directions, thereby changing a distribution direction of ink particles 201.

The ink particles 201 are accommodated in the capsule body 200. The ink particles 201 may include a plurality of first color particles and a plurality of second color particles. Among the first color particles and the second color particles, one type is black particles and the other type is white particles, and the first color particles and the second color particles have opposite electrical properties.

The display module in the present disclosure may be controlled in the following manners:

In a case that a voltage is applied to the first electrode 210, an electric field is created between a cathode and an anode of the first electrode 210, and an electrophoretic phenomenon occurs under the action of the electric field to realize distribution of the ink particles 201 along the first electrode 210. For example, among the plurality of black particles and the plurality of white particles, one type moves toward the cathode of the first electrode 210 and the other type moves toward the anode of the first electrode 210. For example, the black particles move toward the cathode of the first electrode 210, and the white particles move toward the anode of the first electrode 210. In this way, the plurality of black particles and the plurality of white particles are sequentially disposed along the main light-emitting direction of the display module. In this case, the display module is in a first display state shown in FIG. 7. The display module is configured to perform displaying through the electronic ink layer, and at this time a display screen is in a black and white display mode.

In a case that a voltage is applied to the second electrode 220 and a voltage is applied to the composite light-emitting layer, an electric field is formed between a cathode and an anode of the second electrode 220, and an electrophoretic phenomenon occurs under the action of the electric field, to realize distribution of the ink particles 201 along the second electrode 220. For example, the plurality of black particles and the plurality of white particles are sequentially disposed in a direction parallel to the cover plate layer 100, and a second light transmission gap is formed between the plurality of black particles and the plurality of white particles. In this case, the display module is in a second display state shown in FIG. 8, the composite light-emitting layer can emit light to the cover plate layer 100 through the second light transmission gap, and the display module can perform displaying through the composite light-emitting layer.

In the foregoing settings, the composite light-emitting layer can be an OLED light-emitting layer, and the OLED light-emitting layer has a fast refresh speed so that the display module can be switched to the second display state for use when a user has a need for applications such as movie watching and gaming.

The electronic ink layer implements position shifting of the black particles and the white particles within the capsule body 200 according to a change in a direction of the voltage loaded between the cathode and the anode of the first electrode 210, thereby implementing screen refreshment. The electronic ink layer has low power consumption, and ensures comfort and eye protection with a display effect close to that of paper. In this way, when a user has such needs as long-time reading, the user can switch the display module to the first display state for use.

In conclusion, the user can switch display states of the display module according to different application scenarios and different needs, so that the display module has versatility and improved user experience. It should be noted herein that the first electrode 210 being made of a transparent electrode is to ensure good light transmittance, thereby avoiding interference with light emitted from the composite light-emitting layer.

Figure 2:
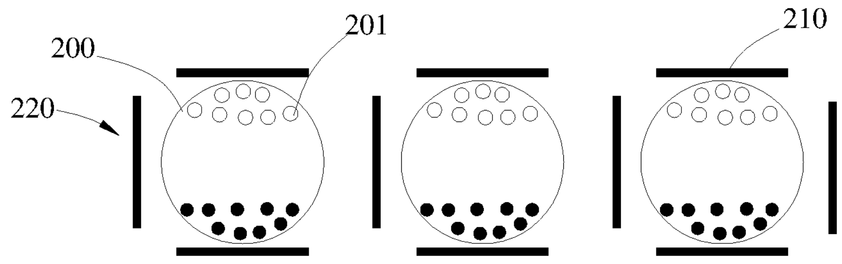
FIG. 2 is a structural diagram of an electronic ink layer disclosed in the first embodiment of the present disclosure.

In some of the embodiments, the electronic ink layer may employ an arrangement as shown in FIG. 1 and FIG. 2. For example, the second electrode 220 may include a plurality of second cathodes and second anodes arranged alternately parallel to the cover plate layer 100, where the capsule body 200 is provided between the second cathode and the second anode that are adjacent. In this arrangement, adjacent capsule bodies 200 can both use the second cathode or second anode located between the two of them. This can reduce the number of second cathodes and the number of second anodes required, reducing material costs.

Figure 3:
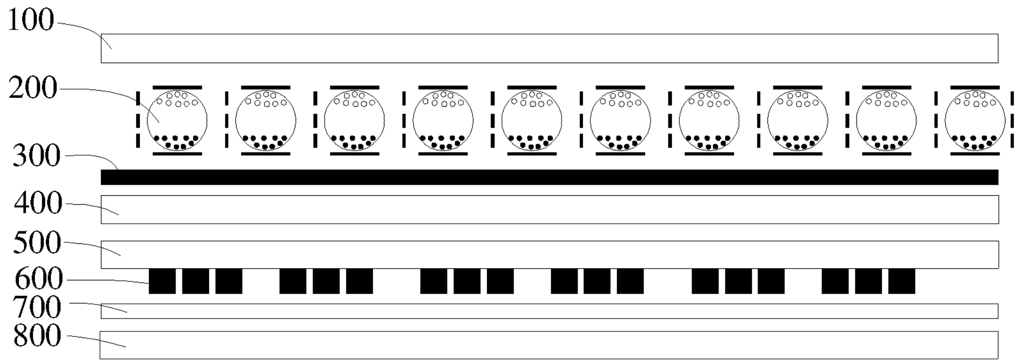
FIG. 3 is a structural diagram of a display module disclosed in a second embodiment of the present disclosure.
Figure 4:
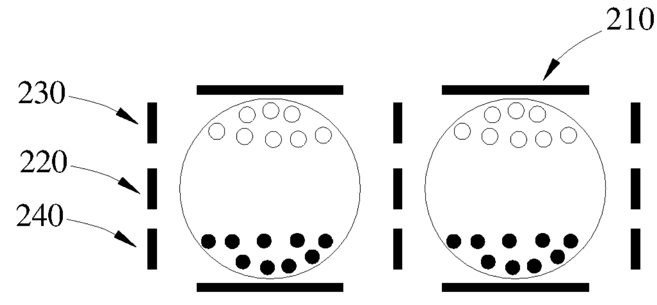
FIG. 4 is a structural diagram of an electronic ink layer disclosed in the second embodiment of the present disclosure.

In some of the embodiments, the electronic ink layer may alternatively employ an arrangement in FIG. 3 and FIG. 4. For example, the capsule body 200 may further be provided with a third electrode 230 on the periphery of the capsule body. A disposing direction of the third electrode 230 intersects with the cover plate layer 100. For example, the disposing direction of the third electrode 230 coincides with a disposing direction of the second electrode 220, and the third electrode 230 is disposed between the second electrode 220 and the cover plate layer 100.

Correspondingly, in the case that a voltage is applied to the second electrode 220, an electric field is created between the cathode and the anode of the second electrode 220, and the ink particles 201, subjected to the action of a force of the electric field, are distributed along the second electrode 220 to form the second light transmission gap.

Similarly, in the case that a voltage is applied to the third electrode 230, among the black particles and the white particles in the ink particles 201, one type moves toward a cathode of the third electrode 230, and the other type moves toward an anode of the third electrode 230, so that the plurality of black particles and the plurality of white particles are disposed sequentially in a direction parallel to the cover plate layer 100, to distribute the ink particles 201 along the third electrode 230 to form a third light transmission gap. In the present disclosure, the third light transmission gap is smaller than the second light transmission gap.

Figures 7, 8, 9:
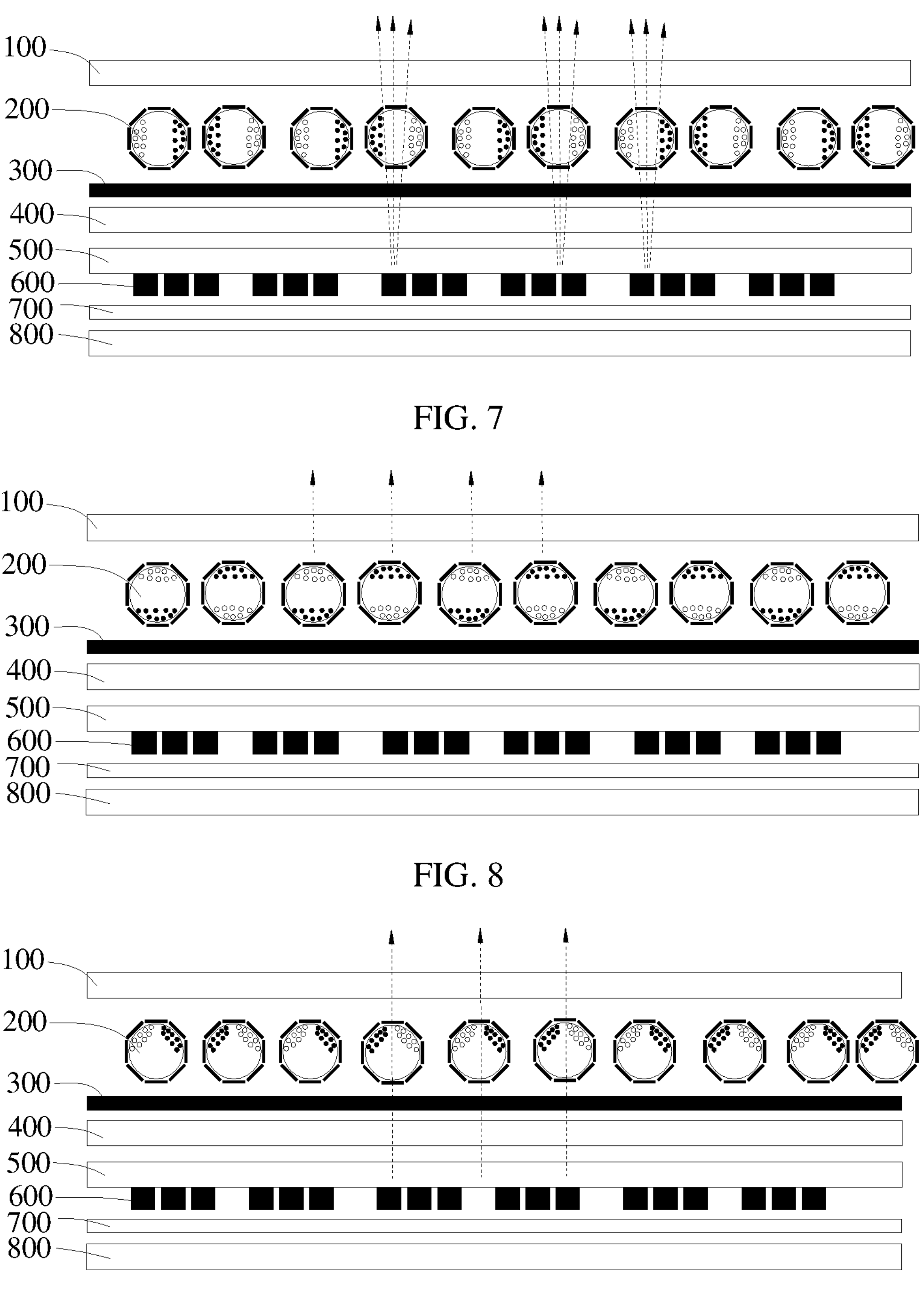
FIG. 7 is a diagram of a second display state of the display module disclosed in the third embodiment of the present disclosure.
FIG. 8 is a diagram of a first display state of the display module disclosed in the third embodiment of the present disclosure.
FIG. 9 is a diagram of a third display state of the display module disclosed in the third embodiment of the present disclosure.

Therefore, in the case that a voltage is applied to the third electrode 230 and a voltage is applied to the composite light-emitting layer, light emitted from the composite light-emitting layer is irradiated to the cover plate layer 100 through the third light transmission gap, so that the display module is in a third display state shown in FIG. 9.

As can be learned, because the third light transmission gap is smaller than the second light transmission gap, light coming from the sides is blocked by the black particles and the white particles in the ink particles 201, and the user can see, from only one direction, for example, a direction directly facing the display module, an image displayed by the display module. In this way, when the user is using the display module, other people cannot pry into the image displayed by the display module. This is beneficial to the user's privacy protection, and enriches display modes of the display module, thereby improving user experience.

For an arrangement of the third electrode 230, the third electrode 230 can also be disposed in accordance with the second electrode 220. For example, as shown in FIG. 3 and FIG. 4, the third electrode 230 may include a plurality of third cathodes and third anodes arranged alternately parallel to the cover plate layer 100. The capsule body 200 is provided between the third cathode and the third anode that are adjacent, thereby implementing reuse of the third cathodes and the third anodes, thereby saving material costs.

In one of the embodiments, the capsule body 200 is further provided with a fourth electrode 240 on the periphery of the capsule body. A disposing direction of the fourth electrode 240 intersects with the cover plate layer 100, and the fourth electrode 240 is disposed between the second electrode 220 and the composite light-emitting layer. In this way, in the case that a voltage is applied to the fourth electrode 240, an electric field force action is created between a cathode and an anode of the fourth electrode 240. In this way, the ink particles 201 are distributed along the fourth electrode 240 to form a fourth light transmission gap.

In the present disclosure, the fourth light transmission gap is smaller than the second light transmission gap. Therefore, in the case that a voltage is applied to the fourth electrode 240 and a voltage is applied to the composite light-emitting layer, light emitted from the composite light-emitting layer is irradiated to the cover plate layer 100 through the fourth light transmission gap, so that the display module can be in the third display state shown in FIG. 9.

In the foregoing settings, the fourth electrode 240 may be understood as a spare part of the third electrode 230, and the fourth electrode 240 implements a function similar to that of the third electrode 230, both of which are to implement privacy protection for the user. Optionally, the fourth electrode 240 may be understood as a mirror structure of the third electrode 230 that is symmetric to the third electrode 230 about the capsule body 200, thereby forming the foregoing fourth light transmission gap.

Similarly, for a layout of the fourth electrode 240, the fourth electrode 240 can also be disposed in accordance with the second electrode 220. For example, as shown in FIG. 3 and FIG. 4, the fourth electrode 240 includes a plurality of fourth cathodes and fourth anodes arranged alternately parallel to the cover plate layer 100. The capsule body 200 is provided between the fourth cathode and the fourth anode that are adjacent, to implement reuse of the fourth cathode and the fourth anode, thereby saving material costs.

Figure 5:
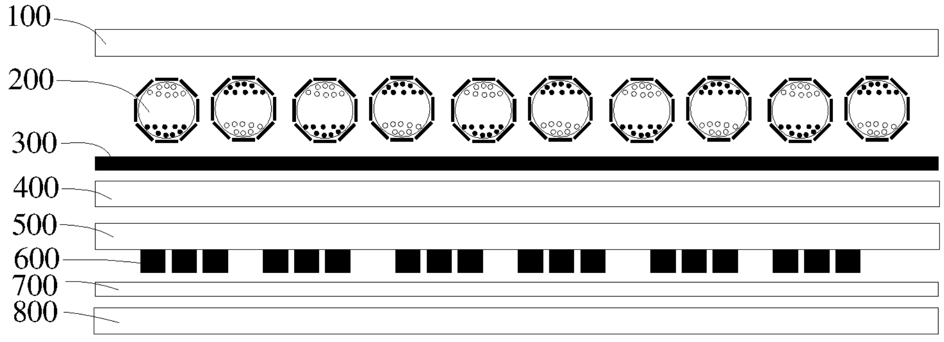
FIG. 5 is a structural diagram of a display module disclosed in a third embodiment of the present disclosure.
Figure 6:
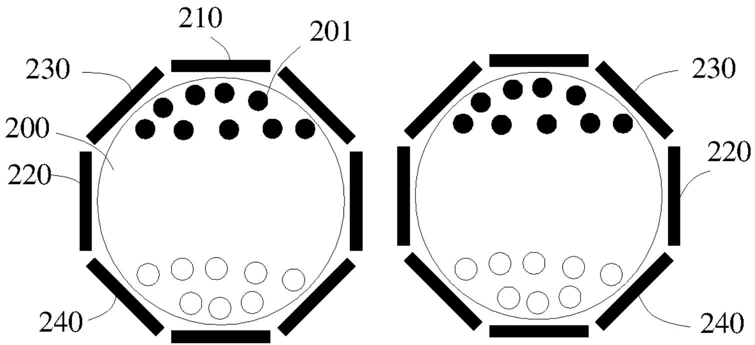
FIG. 6 is a structural diagram of an electronic ink layer disclosed in the third embodiment of the present disclosure.

In some of the embodiments, the electronic ink layer may alternatively employ an arrangement in FIG. 5 and FIG. 6. For example, a plurality of second electrodes 220, a plurality of third electrodes 230, and a plurality of fourth electrodes 240 may be provided. The plurality of second electrodes 220, the plurality of third electrodes 230, and the plurality of fourth electrodes 240 may all be arranged parallel to the cover plate layer 100.

Under such an arrangement, the second electrodes 220, the third electrodes 230, and the fourth electrodes 240 are all electrode pairs, and they all correspond to the capsule bodies 200, respectively, to form a plurality of capsule body components, so that the capsule bodies 200 can be independently manipulated.

Optionally, for a shape of the capsule body 200, to facilitate formation of the second light transmission gap, the third light transmission gap, and the fourth light transmission gap that are described above, the capsule body 200 may be set to have a shape as formed by two mutually mirrored circular truncated cone or cones, and a desired light transmission gap may be formed by constraining the shape of the capsule body 200.

To facilitate manufacturing and layout, the capsule body 200 is designed as a sphere in the present disclosure. A chord length corresponding to the capsule body 200 at any height position in a height range in which the second electrode 220 is located is greater than a chord length corresponding to the capsule body 200 at any height position in a height range in which the third electrode 230 is located, and is greater than a chord length corresponding to the capsule body 200 at any height position in a height range in which the fourth electrode 240 is located. A direction of the height coincides with a direction in which the composite light-emitting layer, the electronic ink layer, and the cover plate layer 100 are disposed in sequence, and a direction of the chord length is perpendicular to the direction of the height.

Under such a setting, when a voltage is applied to the second electrode 220, the ink particles 201 are distributed along the second electrode 220, and a spacing between the plurality of black particles and the plurality of white particles in the ink particles 201, that is, the second light transmission gap, has a maximum value. In this way, when the composite light-emitting layer emits light, the electronic ink layer can have good light transmittance, thereby ensuring a display effect of the display module in the second display state shown in FIG. 8.

Similarly, under such a setting, when a voltage is applied to the third electrode 230 or the fourth electrode 240, because the chord length corresponding to the position of the third electrode 230 or the fourth electrode 240 is shorter, under a constraint of a contour of the capsule body 200, the formed third light transmission gap or fourth light transmission gap is smaller than the second light transmission gap. This ensures a constraint on a direction of light emitted by the composite light-emitting layer, and guarantees a display effect of the display module in the third display state shown in FIG. 9, implementing privacy protection.

Optionally, as shown in FIG. 5 and FIG. 6, a vertical bisector of the first electrode 210, a vertical bisector of the second electrode 220, a vertical bisector of the third electrode 230, and a vertical bisector of the fourth electrode 240 all pass through a center of sphere of the capsule body 200. Compared with the layout in FIG. 3 and FIG. 4, under such a setting, because the first electrode 210, the second electrode 220, the third electrode 230, and the fourth electrode 240 are all disposed toward the center of sphere of the capsule body 200, a larger electric field force can be generated, acting on the ink particles 201 so that a layout direction of the ink particles 201 can be more effectively adjusted according to a position of the applied voltage. This is more conducive to the formation of the second light transmission gap, the third light transmission gap, and the fourth light transmission gap.

In an arrangement solution, the first electrode 210, the second electrode 220, the third electrode 230, and the fourth electrode 240 may be combined to form an octagonal shape, to surround the capsule body 200. For example, the first electrode 210, the second electrode 220, the third electrode 230, and the fourth electrode 240 are all provided as electrode plates. The cathode and the anode of the first electrode 210 are both disposed parallel to the cover plate layer 100, and the second cathode and the second anode are both disposed perpendicular to the cover plate layer 100. The third cathode and the third anode are arranged at an angle to each other, such as 135°, and are both disposed between the second electrode 220 and the cathode of the first electrode 210. The fourth cathode and the fourth anode are arranged at an angle to each other, such as 135°, and are both disposed between the second electrode 220 and the anode of the first electrode 210. Such a setting makes the layout structure more compact, improving a space utilization rate. It should be noted herein that the foregoing angle may alternatively be 90° or the like. Details are not described herein.

Figure 10:
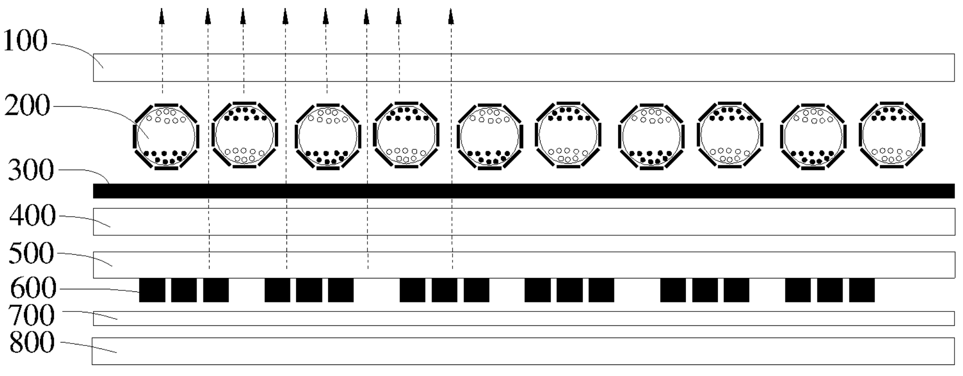
FIG. 10 is a diagram of a fourth display state of the display module disclosed in the third embodiment of the present disclosure.

In an implementation, as shown in FIG. 6 and FIG. 10, a first light transmission gap may exist between adjacent capsule bodies 200, and the second electrode 220, the third electrode 230, and the fourth electrode 240 may all be disposed in the first light transmission gap. In the case that a voltage is applied to the first electrode 210 and a voltage is applied to the composite light-emitting layer, the display module is configured to perform displaying through the electronic ink layer and the composite light-emitting layer, thereby creating a fourth display state shown in FIG. 10.

Under such a setting, the electronic ink layer emits light, which is irradiated to the cover plate layer 100, and light emitted from the composite light-emitting layer is also irradiated to the cover plate layer 100 through the first light transmission gap. Thus, with the cooperation of the two types of light, the display module will have a display effect of a color ink screen. This can enrich display modes of the display module, thereby improving user experience.

Optionally, the first electrode 210, the second electrode 220, the third electrode 230, and the fourth electrode 240 can all be fabricated by selecting a transparent polar plate to ensure a good conductive effect and light transmittance. Especially in the fourth display state shown in FIG. 10, the transparent designs of the second electrode 220, the third electrode 230, and the fourth electrode 240 can avoid interference with the light emitted from the composite light-emitting layer, thereby guaranteeing the display effect.

Optionally, the composite light-emitting layer and the electronic ink layer of the display module may employ a layout in FIG. 5 and FIG. 6. For example, a plurality of first electrodes 210 may be provided, the plurality of first electrodes 210 are arranged parallel to the cover plate layer 100. The first electrodes 210 are corresponding to the capsule bodies 200, respectively, meaning a one-to-one control mode is implemented between the first electrodes 210 and the capsule bodies 200.

For a structure of the composite light-emitting layer when the composite light-emitting layer is an OLED display, the composite light-emitting layer may include a fifth cathode layer 800, an electron transport layer 700, an organic light-emitting layer 600, a hole transport layer 500, and a fifth anode layer 400 stacked sequentially. The fifth anode layer 400 is a transparent anode layer and is disposed on a side of the composite light-emitting layer facing the electronic ink layer, ensuring light transmittance and avoiding interference with the light emitted from the composite light-emitting layer.

When the fifth cathode layer 800 and the fifth anode layer 400 are energized, electrons are transmitted from the fifth cathode layer 800 to the electron transport layer 700, and electron holes are injected from the fifth anode layer 400 into the hole transport layer 500. Then, the electrons and the electron holes migrate to the organic light-emitting layer 600, and excitons are generated after the electrons and the electron holes meet, implementing light emission of the composite light-emitting layer.

Optionally, the fifth anode layer 400 may be made of ITO material, and the ITO material is typically referred to as indium tin oxide, which is an N-type oxide semiconductor. The fifth anode layer 400 is typically fabricated as an ITO thin film structure, that is, an indium tin oxide semiconductor transparent conductive film, to ensure good resistivity and light transmittance. Therefore, the fifth anode layer 400 in the composite light-emitting layer is located on the side toward the electronic ink layer, implementing effective light emission. The fifth cathode layer 800 may be fabricated by using a metal electrode, such as magnesium or lithium. Details are not described herein.

Optionally, a transparent insulating layer 300 may further be provided between the composite light-emitting layer and the electronic ink layer, and the transparent insulating layer 300 can prevent short circuit between the composite light-emitting layer and the electronic ink layer, thereby ensuring effective displaying of the display module in each display state. For a structure of the transparent insulating layer 300, a transparent resin may be used to ensure good light transmittance and insulating properties, preventing interference with irradiation of light emitted from the composite light-emitting layer to the cover plate layer 100.

Figure 11:
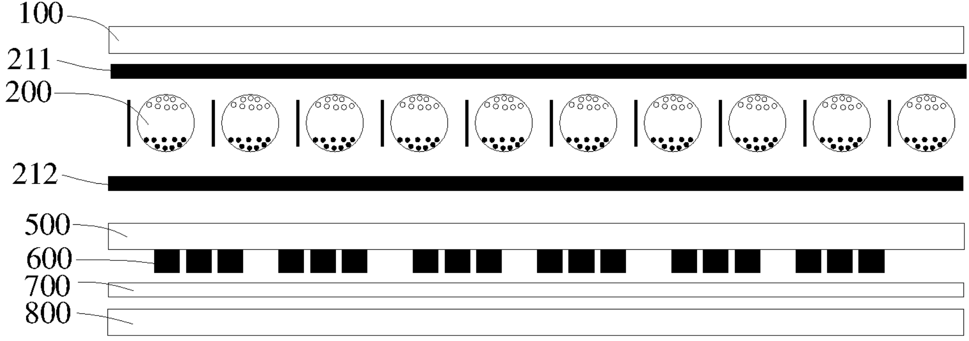
FIG. 11 is a structural diagram of a display module disclosed in a fourth embodiment of the present disclosure.
Figure 12:
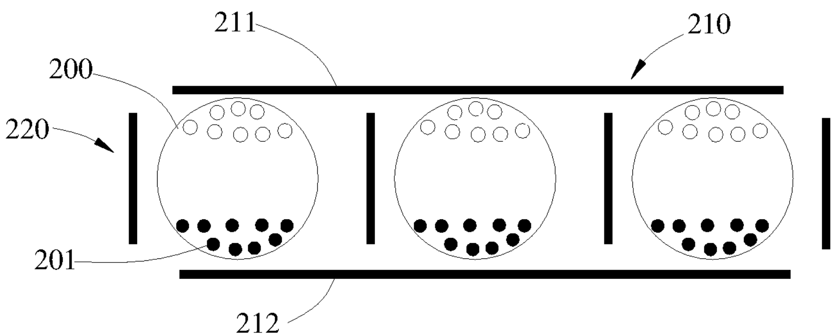
FIG. 12 is a structural diagram of an electronic ink layer disclosed in the fourth embodiment of the present disclosure.

In some other embodiments, the composite light-emitting layer and the electronic ink layer of the display module may alternatively employ a layout in FIG. 11 and FIG. 12. For example, the first electrode 210 may include a first cathode layer 211 and a first anode layer 212 spaced apart, the first cathode layer 211 and the first anode layer 212 are both disposed parallel to the cover plate layer 100, and the plurality of capsule bodies 200 are all disposed between the first cathode layer 211 and the first anode layer 212.

The composite light-emitting layer includes a fifth cathode layer 800, an electron transport layer 700, an organic light-emitting layer 600, and a hole transport layer 500 stacked sequentially toward the electronic ink layer, and the first anode layer 212 is located between the hole transport layer 500 and the plurality of capsule bodies 200.

In this way, in a case that a voltage is applied between the first cathode layer 211 and the first anode layer 212, the display module is configured to perform displaying through the electronic ink layer. In a case that a voltage is applied to the second electrode 220 and a voltage is applied between the first anode layer 212 and the fifth cathode layer 800, the display module is configured to perform displaying through the composite light-emitting layer. As can be learned, under such a setting, the composite light-emitting layer and the electronic ink layer both use the first anode layer 212, and the composite light-emitting layer does not need to be additionally provided with a fifth anode layer 400 as in the layout solution shown in FIG. 5 and FIG. 6. This can reduce material costs and is conducive to overall thinning of the display module.

Embodiments of the present disclosure further disclose an electronic device. The electronic device includes the display module in any one of the foregoing embodiments.

The electronic device disclosed in embodiments of the present disclosure may be a smartphone, a tablet computer, an e-book reader, a wearable device (for example, a smart watch), a game console, or other devices. A type of the electronic device is not limited in embodiments of the present disclosure.

The foregoing describes the embodiments of the present disclosure with reference to the accompanying drawings. However, the present disclosure is not limited to the foregoing implementations. The foregoing implementations are illustrative rather than restrictive. A person of ordinary skill in the art can understand that various changes, modifications, replacements, and variants may be made to these embodiments without departing from the principle and purpose of the present disclosure, and the scope of the present disclosure is limited by the claims and their equivalents

What is claimed is:

1. A display module, comprising a composite light-emitting layer, an electronic ink layer, and a cover plate layer disposed in sequence, wherein the electronic ink layer comprises a plurality of capsule bodies, and the plurality of capsule bodies are arranged along a plane on which the cover plate layer is located, wherein a first electrode and a second electrode are provided on a periphery of a capsule body, the first electrode is a transparent electrode and is disposed parallel to the cover plate layer, and the second electrode is disposed perpendicular to the cover plate layer; and ink particles are accommodated in the capsule body;

when a voltage is applied to the first electrode, the ink particles are distributed along the first electrode and the display module is configured to perform displaying through the electronic ink layer; and in when a voltage is applied to the second electrode and a voltage is applied to the composite light-emitting layer, the ink particles are distributed along the second electrode and the display module is configured to perform displaying through the composite light-emitting layer;

wherein the capsule body is further provided with a third electrode on the periphery of the capsule body, a disposing direction of the third electrode intersects with the cover plate layer, and the third electrode is provided between the second electrode and the cover plate layer;

when a voltage is applied to the second electrode, the ink particles are distributed along the second electrode to form a second light transmission gap; and when a voltage is applied to the third electrode, the ink particles are distributed along the third electrode to form a third light transmission gap, wherein the third light transmission gap is smaller than the second light transmission gap.

2. The display module according to claim 1, wherein the second electrode comprises a plurality of second cathodes and second anodes arranged alternately parallel to the cover plate layer, wherein the capsule body is provided between a second cathode and a second anode that are adjacent.

3. The display module according to claim 1, wherein the third electrode comprises a plurality of third cathodes and third anodes arranged alternately parallel to the cover plate layer, wherein the capsule body is provided between a third cathode and a third anode that are adjacent.

4. The display module according to claim 1, wherein a plurality of second electrodes are provided, the plurality of second electrodes are arranged parallel to the cover plate layer, and the second electrodes are corresponding to the capsule bodies, respectively.

5. The display module according to claim 1, wherein the capsule body is a sphere;

a chord length corresponding to the capsule body at any height position in a height range in which the second electrode is located is greater than a chord length corresponding to the capsule body at any height position in a height range in which the third electrode is located; and a direction of the height coincides with a direction in which the composite light-emitting layer, the electronic ink layer, and the cover plate layer are disposed in sequence, and a direction of the chord length is perpendicular to the direction of the height.

6. The display module according to claim 5, wherein a vertical bisector of the first electrode, a vertical bisector of the second electrode, and a vertical bisector of the third electrode all pass through a center of sphere of the capsule body.

7. The display module according to claim 1, wherein a first light transmission gap exists between adjacent capsule bodies; and when a voltage is applied to the first electrode and a voltage is applied to the composite light-emitting layer, the display module is configured to perform displaying through the electronic ink layer and the composite light-emitting layer.

8. The display module according to claim 1, wherein a plurality of first electrodes are provided, the plurality of first electrodes are arranged parallel to the cover plate layer, and the first electrodes are corresponding to the capsule bodies, respectively; and the composite light-emitting layer comprises a fifth cathode layer, an electron transport layer, an organic light-emitting layer, a hole transport layer, and a fifth anode layer stacked sequentially, and the fifth anode layer is a transparent anode layer and is disposed on a side of the composite light-emitting layer facing the electronic ink layer.

9. The display module according to claim 8, wherein a transparent insulating layer is further provided between the composite light-emitting layer and the electronic ink layer.

10. The display module according to claim 1, wherein the first electrode comprises a first cathode layer and a first anode layer spaced apart, the first cathode layer and the first anode layer are both disposed parallel to the cover plate layer, and the plurality of capsule bodies are all disposed between the first cathode layer and the first anode layer;

the composite light-emitting layer comprises a fifth cathode layer, an electron transport layer, an organic light-emitting layer, and a hole transport layer stacked sequentially toward the electronic ink layer, and the first anode layer is located between the hole transport layer and the plurality of capsule bodies;

when a voltage is applied between the first cathode layer and the first anode layer, the display module is configured to perform displaying through the electronic ink layer; and when a voltage is applied to the second electrode and a voltage is applied between the first anode layer and the fifth cathode layer, the display module is configured to perform displaying through the composite light-emitting layer.

11. An electronic device, comprising a display module; wherein the display module comprises a composite light-emitting layer, an electronic ink layer, and a cover plate layer disposed in sequence, wherein the electronic ink layer comprises a plurality of capsule bodies, and the plurality of capsule bodies are arranged along a plane on which the cover plate layer is located, wherein a first electrode and a second electrode are provided on a periphery of a capsule body, the first electrode is a transparent electrode and is disposed parallel to the cover plate layer, and the second electrode is disposed perpendicular to the cover plate layer; and ink particles are accommodated in the capsule body;

when a voltage is applied to the first electrode, the ink particles are distributed along the first electrode and the display module is configured to perform displaying through the electronic ink layer; and when a voltage is applied to the second electrode and a voltage is applied to the composite light-emitting layer, the ink particles are distributed along the second electrode and the display module is configured to perform displaying through the composite light-emitting layer;

wherein the capsule body is further provided with a third electrode on the periphery of the capsule body, a disposing direction of the third electrode intersects with the cover plate layer, and the third electrode is provided between the second electrode and the cover plate layer;

when a voltage is applied to the second electrode, the ink particles are distributed along the second electrode to form a second light transmission gap; and when a voltage is applied to the third electrode, the ink particles are distributed along the third electrode to form a third light transmission gap, wherein the third light transmission gap is smaller than the second light transmission gap.

12. The electronic device according to claim 11, wherein the second electrode comprises a plurality of second cathodes and second anodes arranged alternately parallel to the cover plate layer, wherein the capsule body is provided between a second cathode and a second anode that are adjacent.

13. The electronic device according to claim 11, wherein the third electrode comprises a plurality of third cathodes and third anodes arranged alternately parallel to the cover plate layer, wherein the capsule body is provided between a third cathode and a third anode that are adjacent.

14. The electronic device according to claim 11, wherein a plurality of second electrodes are provided, the plurality of second electrodes are arranged parallel to the cover plate layer, and the second electrodes are corresponding to the capsule bodies, respectively.

15. The electronic device according to claim 11, wherein the capsule body is a sphere;

a chord length corresponding to the capsule body at any height position in a height range in which the second electrode is located is greater than a chord length corresponding to the capsule body at any height position in a height range in which the third electrode is located; and a direction of the height coincides with a direction in which the composite light-emitting layer, the electronic ink layer, and the cover plate layer are disposed in sequence, and a direction of the chord length is perpendicular to the direction of the height.

16. The electronic device according to claim 11, wherein a first light transmission gap exists between adjacent capsule bodies; and when a voltage is applied to the first electrode and a voltage is applied to the composite light-emitting layer, the display module is configured to perform displaying through the electronic ink layer and the composite light-emitting layer.

17. The electronic device according to claim 11, wherein a plurality of first electrodes are provided, the plurality of first electrodes are arranged parallel to the cover plate layer, and the first electrodes are corresponding to the capsule bodies, respectively; and the composite light-emitting layer comprises a fifth cathode layer, an electron transport layer, an organic light-emitting layer, a hole transport layer, and a fifth anode layer stacked sequentially, and the fifth anode layer is a transparent anode layer and is disposed on a side of the composite light-emitting layer facing the electronic ink layer.

18. The electronic device according to claim 11, wherein the first electrode comprises a first cathode layer and a first anode layer spaced apart, the first cathode layer and the first anode layer are both disposed parallel to the cover plate layer, and the plurality of capsule bodies are all disposed between the first cathode layer and the first anode layer;

the composite light-emitting layer comprises a fifth cathode layer, an electron transport layer, an organic light-emitting layer, and a hole transport layer stacked sequentially toward the electronic ink layer, and the first anode layer is located between the hole transport layer and the plurality of capsule bodies;

when a voltage is applied between the first cathode layer and the first anode layer, the display module is configured to perform displaying through the electronic ink layer; and when a voltage is applied to the second electrode and a voltage is applied between the first anode layer and the fifth cathode layer, the display module is configured to perform displaying through the composite light-emitting layer.

* * * * *